Patented Feb. 15, 1944

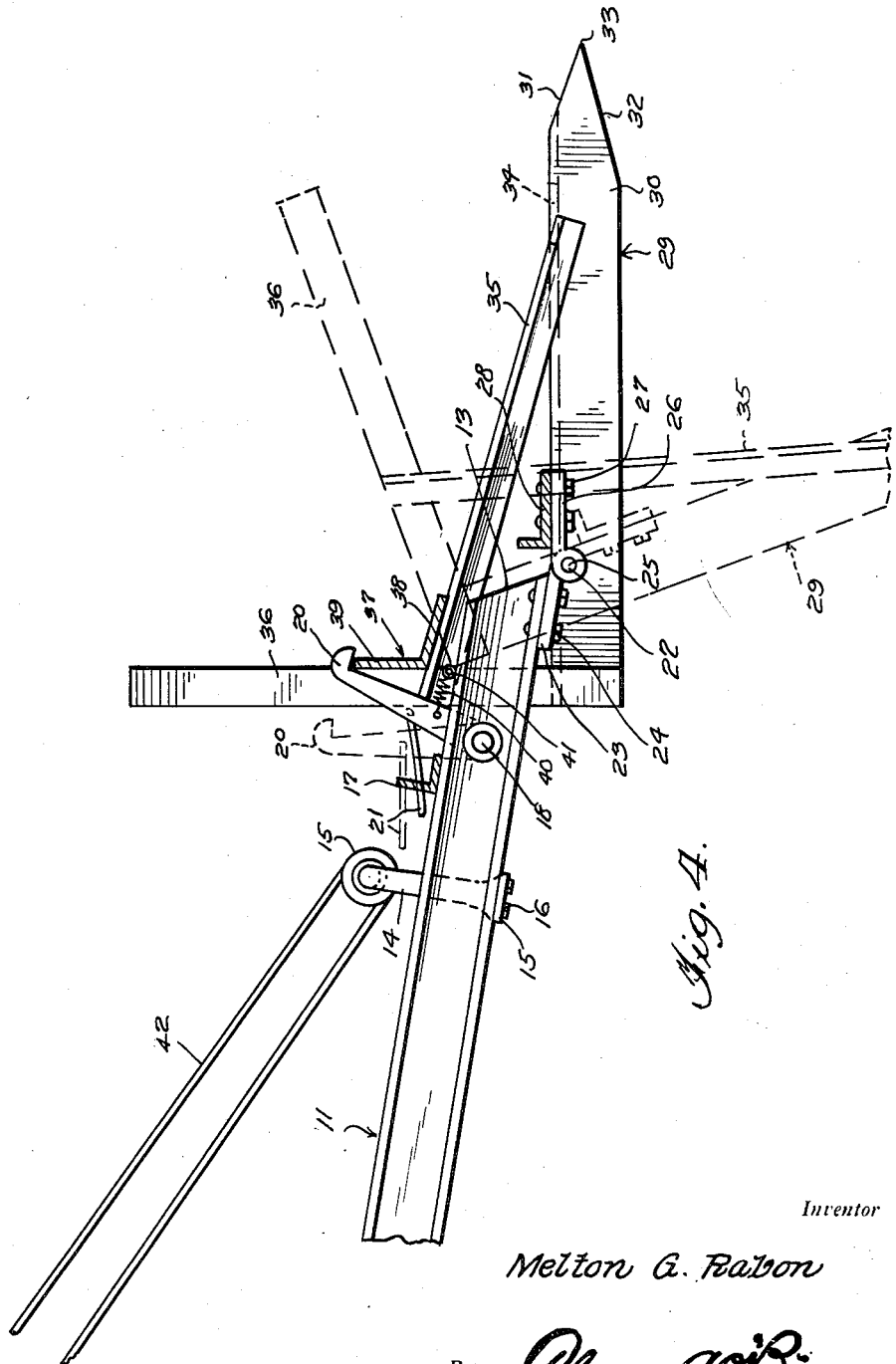

2,341,945

UNITED STATES PATENT OFFICE 2,341,945

HAY RAKE AND LOADER

Melton G. Rabon, Columbia, S. C., assignor of one-half to Wilhelm Hayne Caughman, Columbia, S. C.

Application October 5, 1942, Serial No. 460,835

1 Claim. (Cl. 214—140)

The invention relates to improvements in hay rakes and loaders, and particularly to an arrangement of this character which will pick up the hay from the ground, move the picked up hay to an elevated position, and dump the hay from this elevated position to form a stack or to load a transport vehicle, and the primary object of the invention is to provide an arrangement of this character which is simple and practical in construction and arrangement of parts and can, if desired, be mounted on and operated by a single driver from a truck chassis.

Other important objects and advantages of the invention will be apparent from a reading of the following description taken in connection with the appended drawings, wherein for purposes of illustration a preferred embodiment of the invention is shown.

In the drawings—

Figure 4 is an enlarged longitudinal sectional and side elevational view of the rake per se showing the same in raking position in full lines and in dumping position in phantom lines.

Figure 1:
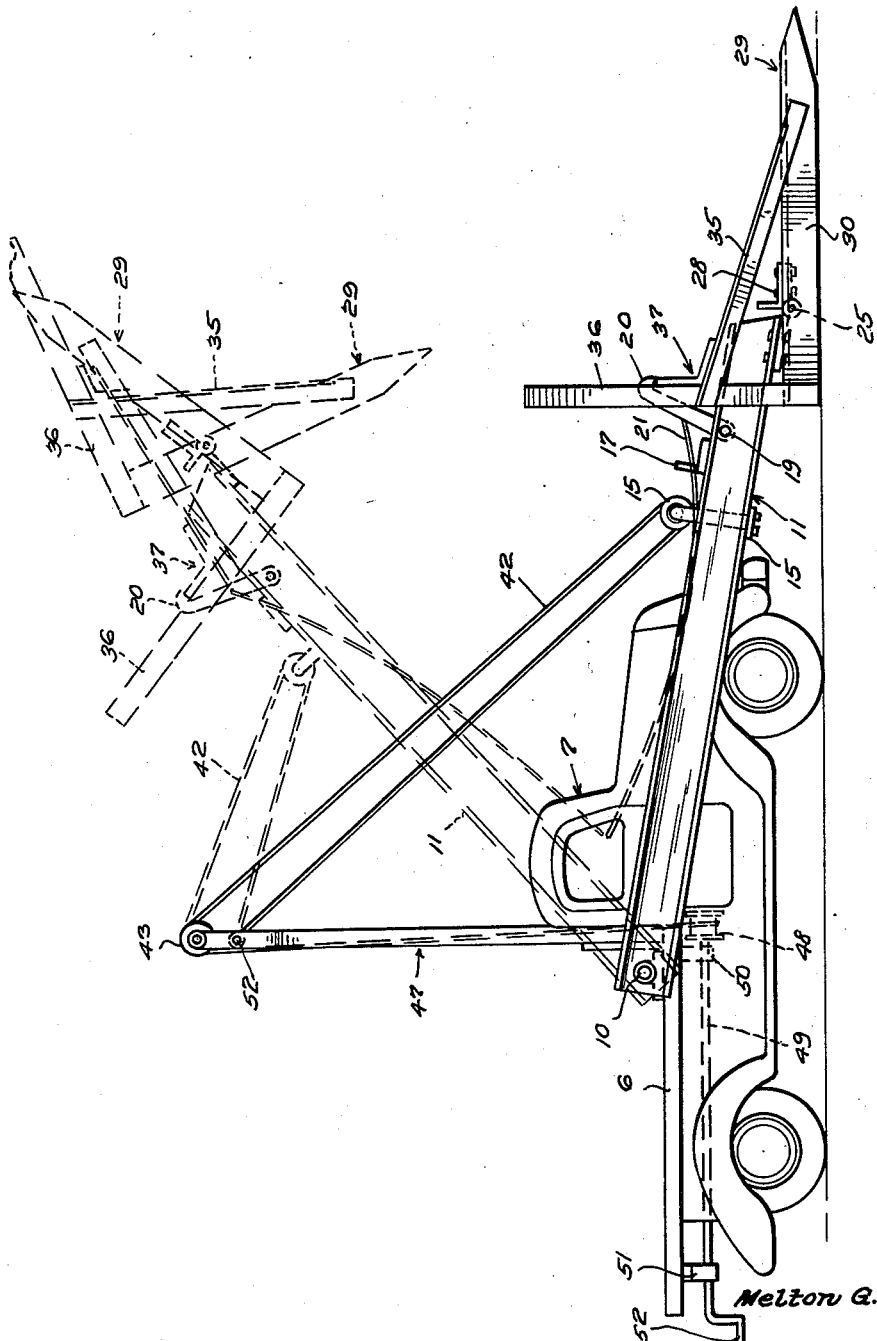
Figure 1 is a general right hand side elevational view of the embodiment showing the same adjusted to raking position in full lines and to dumping position in phantom lines.

Referring in detail to the drawings, the numeral 5 generally designates a truck of suitable capacity and of a type generally available in agricultural establishments, the truck involving a horizontal load carrying platform 6 behind the cab 7. In accordance with the present invention similar journal brackets 8 are mounted on the forward part of the platform 6 and anchored in place by suitable fastening means 9 and a transverse axle 10 is rotatably mounted in these bearings 8. Girders, such as I-beams 11 are fastened at their rear ends to the outer ends of the axle 10 beyond the bearings 8, with suitable spacing means 12 to engage the laterally outward ends of the bearings and prevent undue longitudinal shifting of the axle 10.

The girders 11 merge forwardly to a point substantially in front of the truck whereat they are cut off at a declining angle as indicated by the numeral 13. Behind the terminals 13 an upwardly bowed strut 14 is connected to and between the girders in front of the forepart of the truck to carry a pulley 15 at its center, the opposite ends of the strut having terminal plates 15 which engage the underside of the bottom flanges of the girders where they are secured by rivets or bolts 16. Somewhat forwardly spaced from the strut 14 is an angle iron cross member 17 which is securely fastened to the upper flanges of the girders to act as a cross brace. Slightly forwardly of the cross brace 17 a shaft 18 has its opposite ends journaled in the vertical flanges or webs of the girders 11 as indicated at 19 in Figure 1, and hooks 20 secured to the outer end portions of the shaft 18 adjacent the girders. One of the hooks 20 has a cable or chain 21 attached to an upper or intermediate part thereof, with the chain led into the cab 7 of the truck for easy operation by the driver of the truck.

Attached to the lower flanges of the girders at the front ends thereof are hinge barrel extensions 22 including the plates 23 which engage the lower flanges of the girders and are secured thereto by rivets or bolts as indicated by the numeral 24, with the hinge barrels 22 positioned somewhat forwardly of the ends 13 of the girders. Hinge pins 25 traverse the element 22 and also the barrels of complementary hinge members which include the plates 26 fastened by bolts or rivets 27 to the underside of an angle iron cross member 28 to the bottom of which are welded or otherwise suitably secured the forwardly and rearwardly projecting rake teeth 29 which are parallelly arranged and suitably laterally spaced to form a rake which is wider than the diverging front ends of the girders 11. The rake teeth 29 are in the form of vertically arranged narrow elongated plates set up on edge and tapered at their forward ends on the upper side as indicated by the numeral 41 and on the underside as indicated by the numeral 32, the tapers defining a point 33. The taper 32 enables the rake to climb over uneven places in the ground, while the taper 31 enables the rake to dig under the masses of hay lying on the ground.

Figure 3:
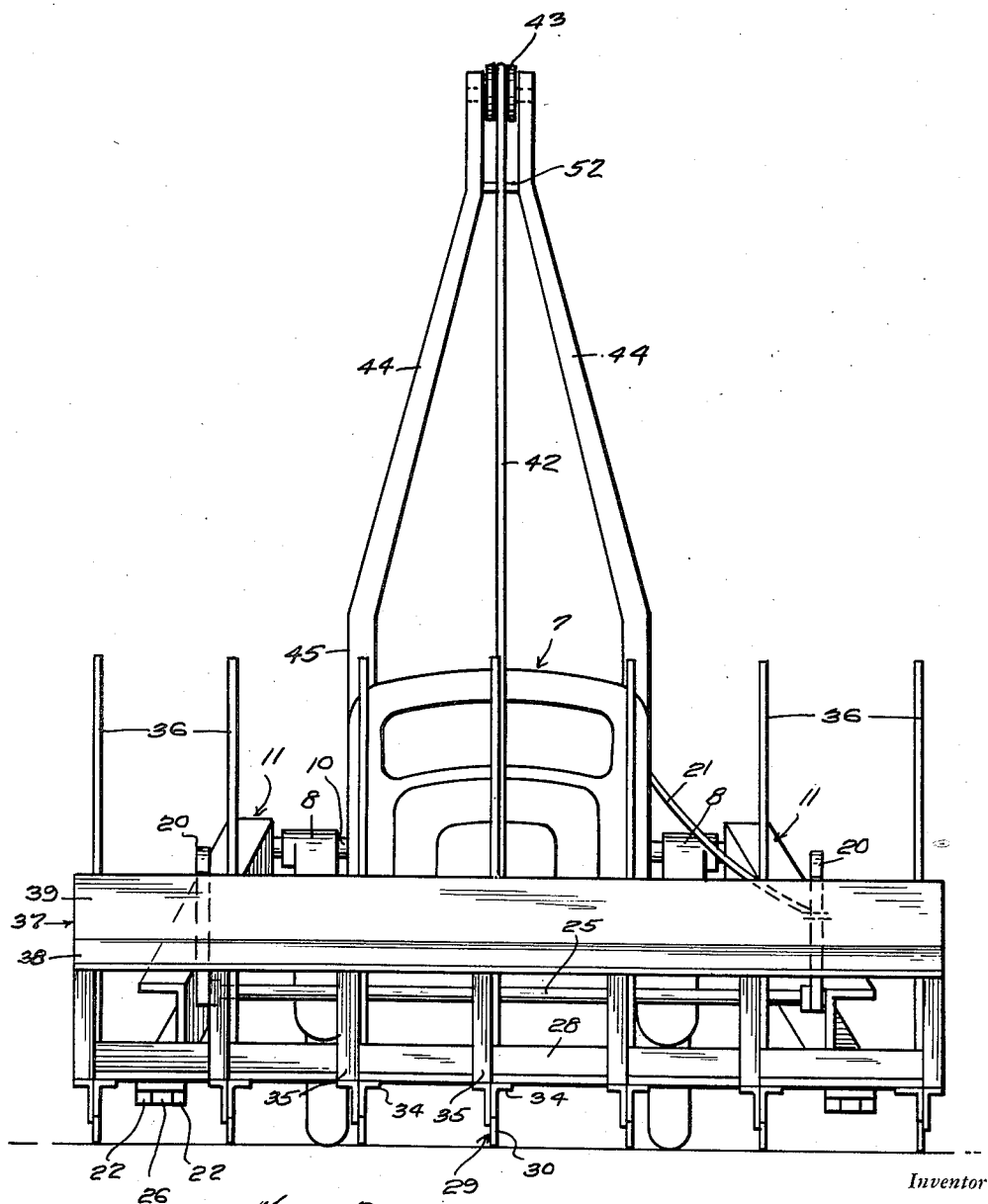
Figure 3 is a front elevational view of Figure 1.

The upper edge of the plate 30 is provided with a lateral flange 34 which is variously arranged to project in inboard and outboard directions as indicated in Figure 3 of the drawings, the opposite side of the plate 30 from the flange 34 having welded or otherwise suitably secured thereto the vertical flange of a rearwardly inclining angle iron brace 35, the same vertical flanges of the braces 35 being welded or otherwise suitably secured at their rear ends to standards 36 which rise from a point of connection alongside the plate 30 of the corresponding rake teeth to which they are secured by riveting or other suitable means, there being one of the standards 36 for each of the rake teeth, and the standards being related to the rake teeth approximately at right angles. A relatively large angle iron transverse brace 37 has its substantially horizontal flange 38 welded or otherwise suitably secured to the horizontal flanges of all of the inclined braces 35, the obtusely angulated flange 39 of the brace 37 being similarly suitably secured to the front edges of the standards 36.

As indicated in Figure 4 of the drawings the hooks 20 have springs 40 stretched between them and an anchor point 41 of the rake to draw the hooks forwardly to normally engage them with the upper edges of the vertical flange 39 of the cross brace 37 in such a way as to hold the rake in a horizontal position such as shown in full lines in Figure 4 of the drawings and thereby prevent the rake from pivoting on the hinge pins 25 to the depressed dumping position shown in phantom lines in Figure 4 of the drawings. To release the hooks 20 to permit the rake to fall to the depressed position and deposit its burden of hay or the like by gravity on a stack or on a transport vehicle, it is necessary only for the driver seated in the cab 7 to pull on the cable or chain 21 in a rearward direction so as to withdraw the hooks 20 from engagement with the flange 39.

Figure 2:
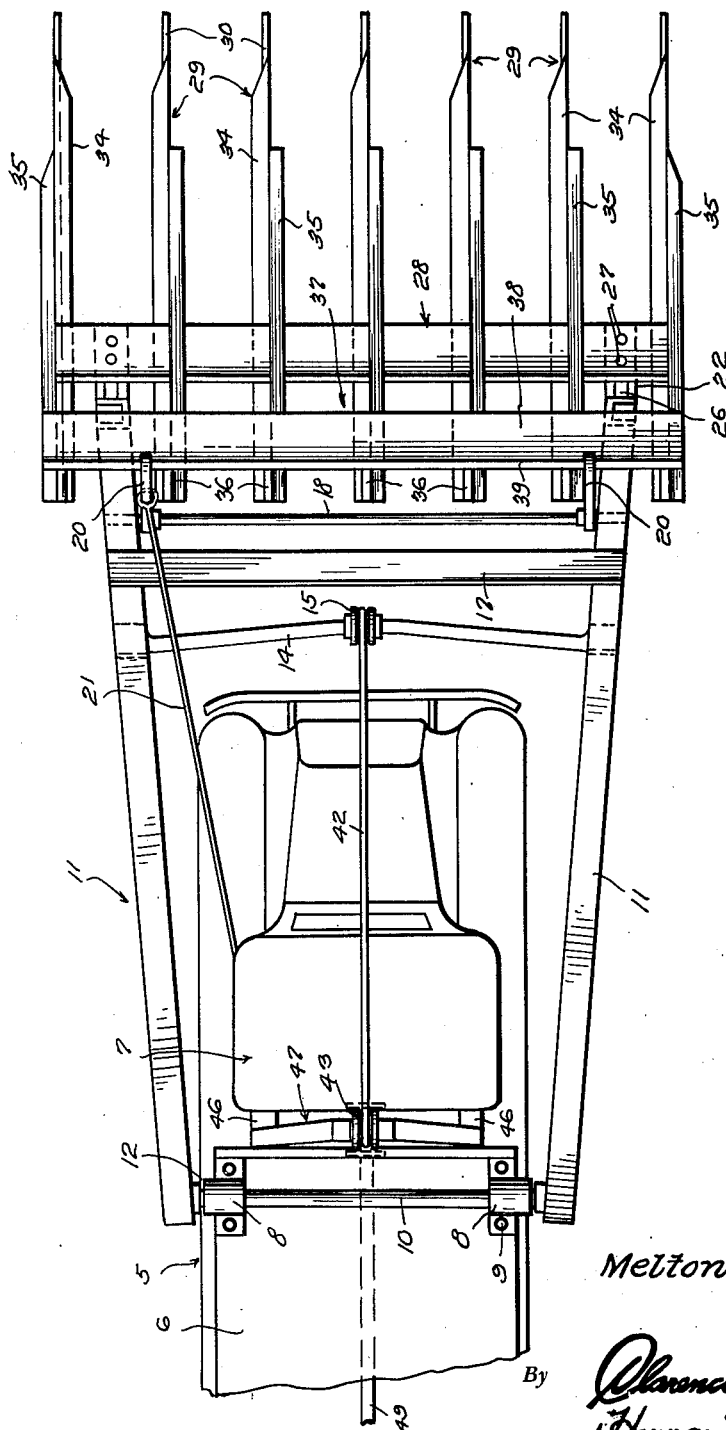
Figure 2 is a top plan view of Figure 1.

For swinging the girders 11 upwardly and downwardly on the axis of the axle 10, a cable 42 is trained over the pulley 15 and also over a pulley 43 rotatably mounted at the upper end of converging arms 44 which have parallel perpendicular portions 45 having their lower ends suitably rigidly secured to chassis side members 46 of the truck 5 between the platform 6 and the cab 7 as indicated in Figure 2 of the drawings. Vertically aligned with the support 47 which is constituted by the legs 44, 45 is the cable drum 48 which is suitably mounted on the chassis of the truck below the load carrying platform 6 and is either manually operated through the medium of a shaft 49 supported in fore and aft bearings 50 and 51, respectively, the shaft having a crank 52 at its rear end, or the manual operation may be replaced by a suitable mechanical connection to the engine of the truck, which can be readily provided without invention. One end of the cable 42 is wound on the drum 48 while the remaining end of the cable is anchored as indicated by the numeral 52 on a suitable anchor on the support 47 below the pulley 43, with the cable trained over the pulleys 43 and 42 as already mentioned.

To elevate the rake from the raking position shown in full lines in Figure 1 to the dotted line position shown in the same figure it is necessary only to wind the cable 42 on the drum 48 until the desired elevation has been achieved.

Reversal of the action of the drum will lower the rake to raking position again.

Although I have shown and described herein a preferred embodiment of my invention, it is to be definitely understood that it is not desired to limit the application of the invention thereto except as may be required by the scope of the subjoined claim.

Having described the invention, what is claimed as new is:

A hay rake and loader comprising a wheeled vehicle including a front cab, a pair of girders having rear ends pivoted on said vehicle in the rear of said cab for vertical swinging movement of the girders alongside opposite sides of the cab, said girders extending forwardly of said vehicle, a rake comprising laterally spaced teeth having rear end uprights thereon, and brace bars inclining from the teeth to the uprights, means to pivotally mount said rake on the front ends of said girders, comprising a member extending across said teeth on top thereof intermediate the ends of the teeth and between the teeth and said brace bars, devices connecting said member to the front ends of the girders for swinging together with said teeth about a horizontal axis in opposite directions, respectively, means to swing said girders vertically comprising a cable winding reel on said vehicle, and a cable operatively connected to said girders and extending from said reel, and detent means for preventing swinging of said teeth and member in one direction comprising an angle iron bar extending across said brace bars and fitted in the angle formed by said brace bars and uprights, a rock shaft extending between said girders, a pair of hooks fast on said shaft at opposite ends of the shaft and movable into and from engagement with said angle iron bar, spring means for moving said hooks into engagement with said angle iron bar, and a pull cable connected to one hook for moving said hooks out of engagement.

MELTON G. RABON.